B. B. A. JOHNSON.
PRODUCTION AND PROJECTION OF PHOTOGRAPHIC RECORDS.
APPLICATION FILED NOV. 12, 1919.
1,425,775.
Patented Aug. 15, 1922.
3 SHEETS—SHEET 3.
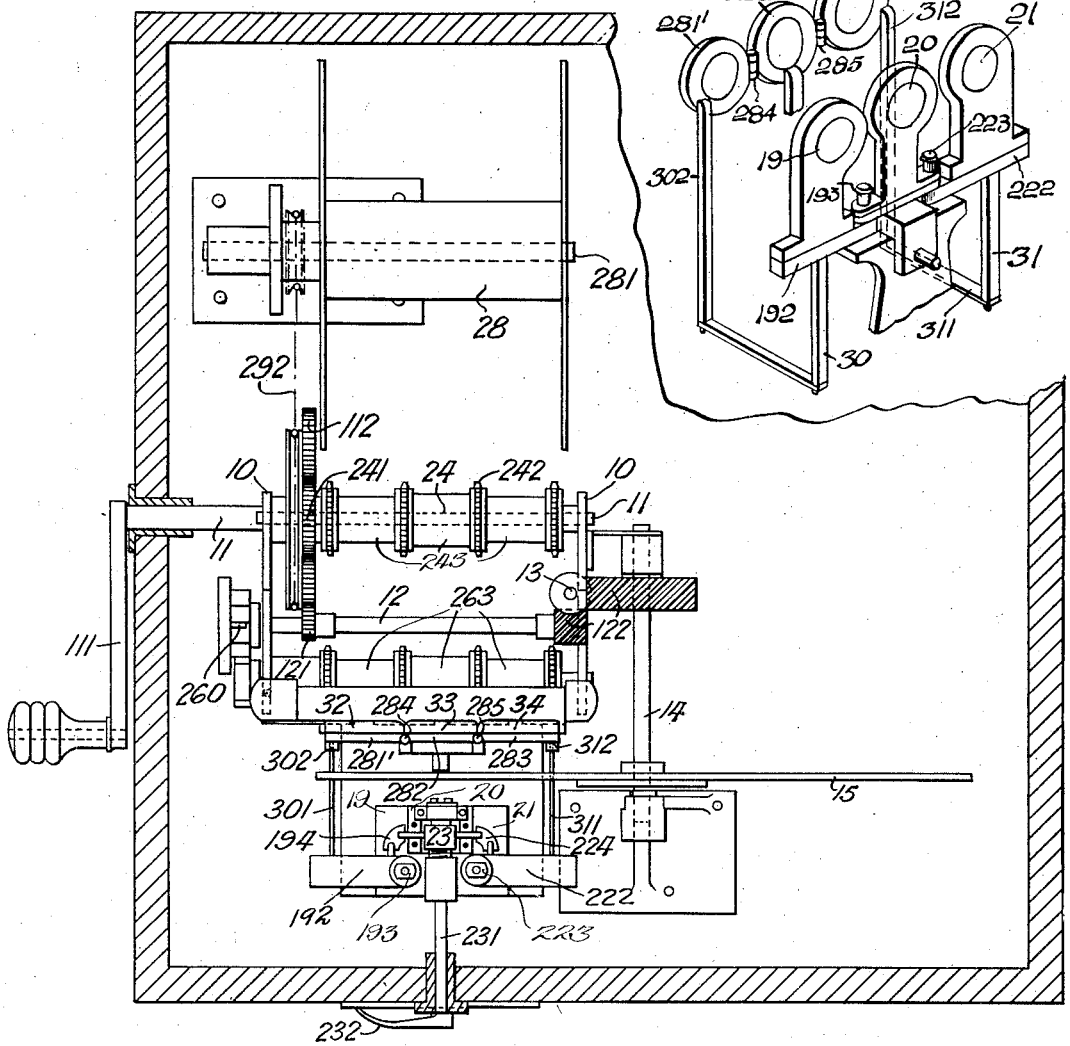
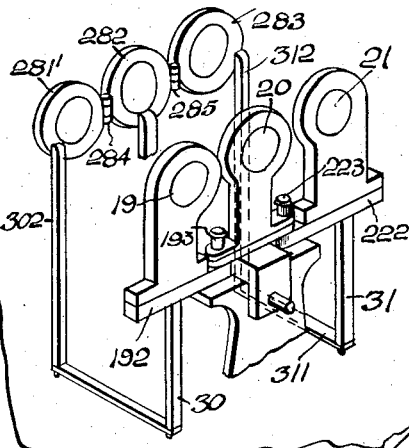
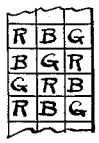

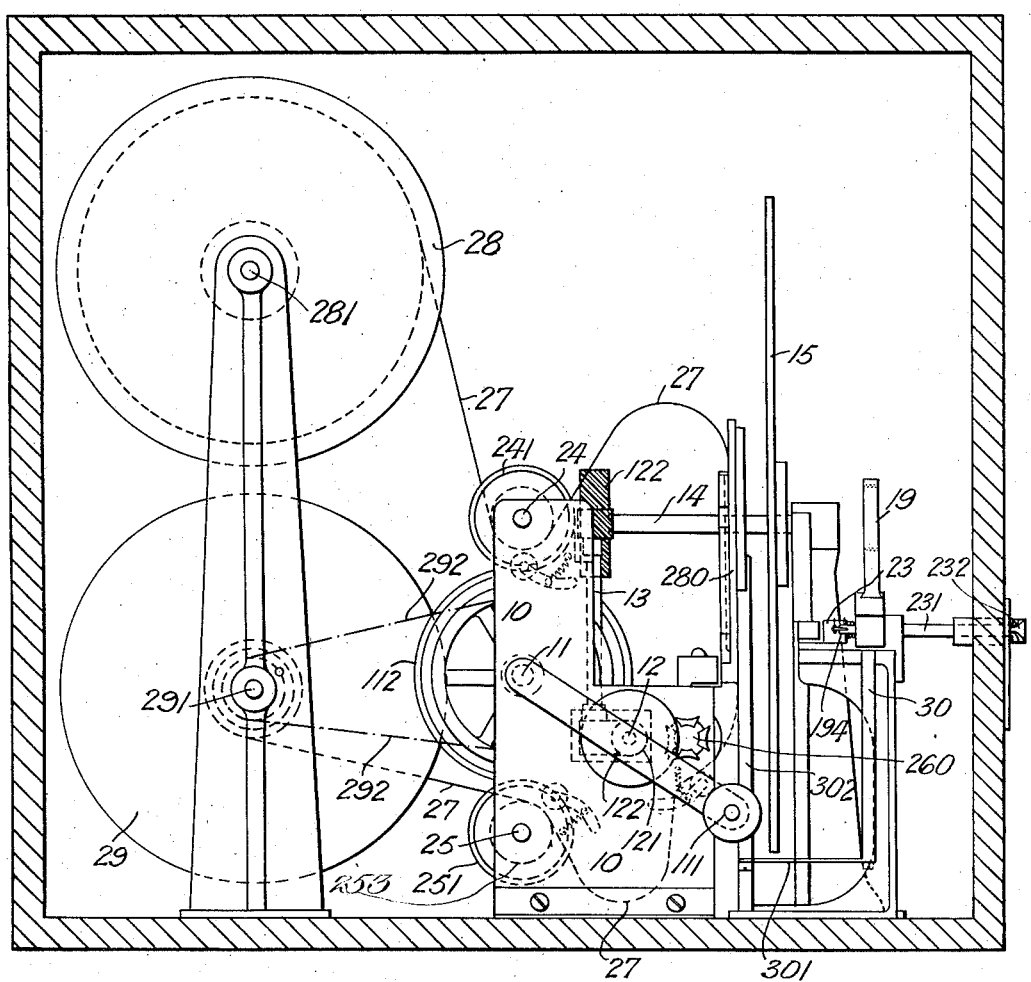

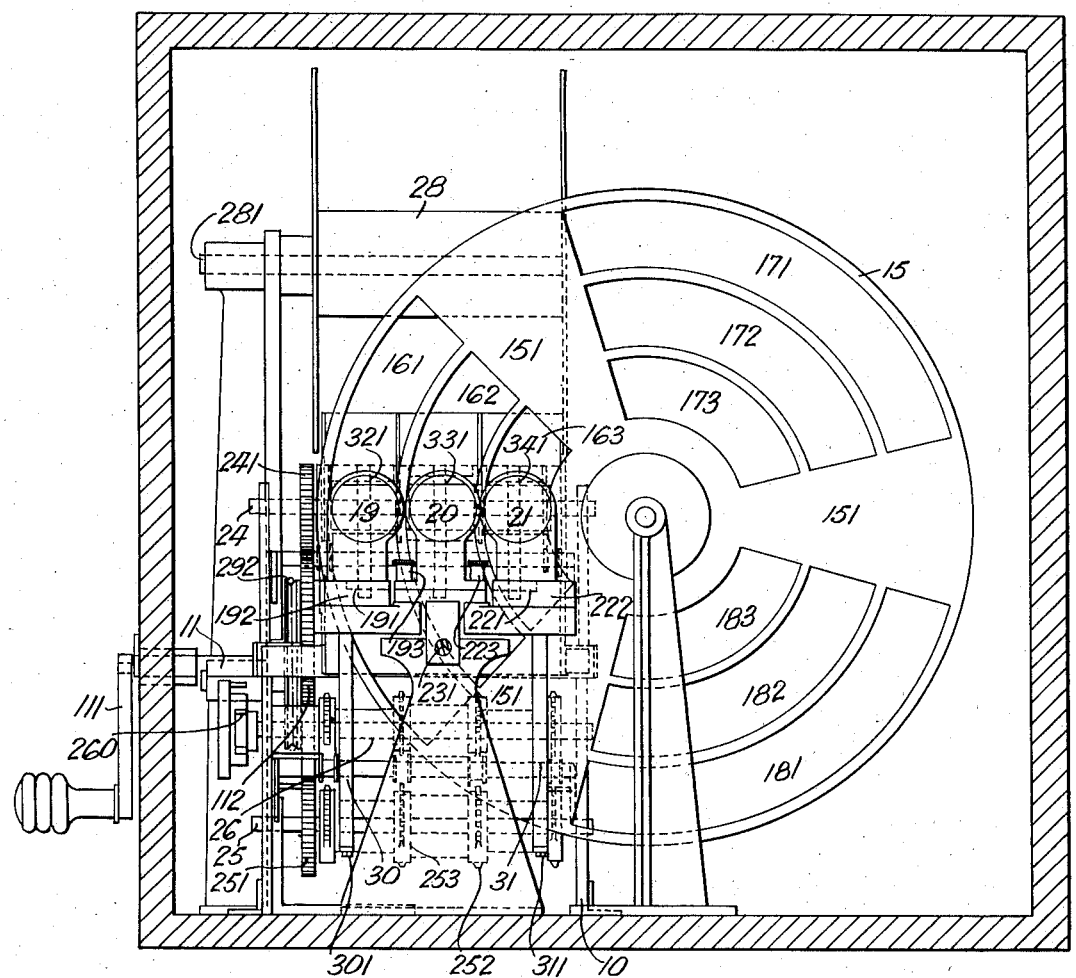

UNITED STATES PATENT OFFICE.

BRENDA BEATRICE ANNE JOHNSON, OF LONDON, ENGLAND.

PRODUCTION AND PROJECTION OF PHOTOGRAPHIC RECORDS.

1,425,775.  Specification of Letters Patent.  Patented Aug. 15, 1922.

Application filed November 12, 1919. Serial No. 337,515.

*To all whom it may concern:*

Be it known that I, BRENDA BEATRICE ANNE JOHNSON, a subject of the King of Great Britain, residing at 128 Piccadilly, London, England, have invented new and useful Improvements in or Relating to the Production and Projection of Photographic Records, of which the following is a specification.

The object of this invention is the production of photographic color records for projection by means of a kinematographic lantern.

According to this invention I take a plurality of lenses and mount them side by side, preferably upon the arc of a horizontal circle so that their optical axes may be adjusted to converge at a common point of intersection when the lenses are focused on the object or objects to be photographed.

With lenses thus arranged in conjunction with color filters suitably placed, and with any necessary addition of prisms, reflectors or screens, photographic records or color records can be produced by making a continuous series of simultaneous exposures.

The color screens are suitably arranged either in front of the lenses or between the lenses and the films, and are simultaneously changed in respect to color in due sequence. The simultaneous changes of the color screens synchronize with the simultaneous changes from one set of exposures to another, so that a constant succession of varying color records are thus obtained on one or more films or film substitutes which have been used to receive the photographic records.

From these negative color records corresponding positive records are obtained which can be projected on to a screen by means of a suitable kinematographic projection apparatus.

Color screens corresponding respectively to those used for producing the negative color records must be used in front of the positive films in the kinematographic projection lantern when they are projected on to a screen and the film or films are projected in consecutive order, each set of records taken at one time being projected in sequence.

In other words, a plurality of negatives are taken simultaneously in varying colors, and the sequence of colors in each set is different from the set preceding. In the reproduction, the individual pictures of each set are produced in sequence, and each picture is projected through a color screen corresponding to the color in which that particular picture was taken.

The drawings show a camera made in accordance with this invention and having three lenses which are exposed simultaneously.

Figure 1 is a side elevation, Figure 2 is a front elevation, Figure 3 is a plan, Figure 4 is a view of the adjustable lenses and gate sections, Figure 5 is a view of a section of the negative film, and Figure 6 a corresponding section of the positive film.

Upon a frame 10 is mounted a shaft 11 having a handle 111. On the shaft 11 is a toothed wheel 112 meshing with another toothed wheel 121 on a shaft 12, which by skew gears 122 drives shafts 13 and 14. Upon the shaft 14 is mounted a color filter screen having three series of color filters 161, 162 and 163; 171, 172 and 173; and 181, 182 and 183. The color filters in each series are arranged in an order different from that of the two adjacent color filters. The parts 151 of the screen 15 are opaque so that the screen also serves as a shutter.

Lenses 19, 20 and 21 are mounted in front of the screen 15, the lens 20 being fixed, while the lenses 19 and 21 are mounted in grooves 191 and 221 in arms 192 and 222 pivoted at 193 and 223 respectively. These arms 192 and 222 are connected to a block 23 by means comprising links 194 and 224. The block 23 is actuated by a worm on a spindle 231 having an indicating handle 232, so that by turning the handle 232 the lenses 19 and 21 can be turned on the pivots 193 and 223 and the lenses thereby adjusted so that their optical axes converge to a common point when they are focussed for use.

The toothed wheel 112 on shaft 11 also meshes with other toothed wheels 241 and 251 on shafts 24 and 25, and the shaft 12 also drives by a maltese cross wheel 260 a shaft 26 with intermittent motion. On the shafts 24, 25 and 26 are sprocket wheels 242, 252 and 262, by which the film, which is of sufficient width to receive three pictures side by side, is controlled. The sprockets engage with holes in the film in the usual manner and are spaced apart by movable sleeves 243, 253 and 263.

The film 27 is drawn from a spool 28 on a shaft 281 by the sprockets 242 on the shaft 24 and thence through a gate 280 by the sprockets 262 on the shaft 26, and is wound on a spool 29 on a shaft 291 driven by a belt 292 from a wheel on the shaft 11.

From the underside of the arms 192 and 222 depend past the screen 15 two rods 30 and 31 attached by rods or links 301 and 311 to arms 302 and 312. The gate 280 is formed of three sections 281', 282 and 283 hinged at 284 and 285, and the arms 302 and 312 are connected to the side sections 281' and 283. An adjustment of the lenses 19 and 21 therefore produces a corresponding adjustment of the gate sections 281' and 283, thus ensuring that all portions of the film when passing down the gate are always at the same distances from the lenses. Plates 32, 33 and 34 are provided with flat springs 321, 331 and 341 which press the films against the gate.

I claim:

1. In a camera, three lenses comprising a fixed central lens, movable arms at each side of the fixed lens and upon which the other lenses are mounted, a block, a worm for actuating it, and links connecting the arms to the block.

2. In a camera, in combination three lenses comprising a fixed central lens, arms pivoted on each side of the fixed lens upon which the other lenses are mounted, a connection between the arms for turning them together, rods depending from the under side of the arms, other rods attached to these rods, other arms attached to the second rods, and gates attached to the second arms.

3. In a camera, in combination three lenses comprising a fixed central lens, arms pivoted on each side of the fixed lens upon which the other lenses are mounted, a connection between the arms for turning them together, rods depending from the under side of the arms, other rods attached to these rods, other arms attached to the second rods, and three gate sections hinged together and attached to the second arms.

4. A camera comprising a plurality of relatively adjustable lenses, means for obtaining a relative adjustment of said lenses, a sectional film gate, and means for automatically maintaining said gate sections in a predetermined relation to said lenses during said adjustment.

5. A camera comprising a plurality of lenses, certain of which are adjustable, a film gate having a plurality of sections corresponding in number to the number of said lenses, and means for simultaneously adjusting the adjustable lenses and the gate sections corresponding thereto.

6. A camera comprising a fixed lens, an adjustable lens on each side thereof, a film gate having a fixed section corresponding to said fixed lens and an adjustable section corresponding to each of said adjustable lenses, and means for simultaneously adjusting said adjustable lenses and said adjustable sections to maintain the same in predetermined relation.

In testimony that I claim the foregoing as my invention, I have signed my name this 7th day of October, 1919.

BRENDA BEATRICE ANNE JOHNSON.